United States Patent [19]

Ganoung

[11] 4,172,588
[45] Oct. 30, 1979

[54] DAMPING SYSTEM FOR VEHICULAR SUSPENSION

[75] Inventor: David P. Ganoung, Albuquerque, N. Mex.

[73] Assignee: James K. Gilman, Albuquerque, N. Mex. ; a part interest

[21] Appl. No.: 886,876

[22] Filed: Mar. 15, 1978

[51] Int. Cl.² ............................................. B60G 19/06
[52] U.S. Cl. .................................................. 267/11 A
[58] Field of Search ..................... 267/11 A, 11 R, 12, 267/13, 65 R; 280/702, 703, 709

[56] References Cited

U.S. PATENT DOCUMENTS

| | | | |
|---|---|---|---|
| 2,077,969 | 4/1937 | Tibbetts | 267/11 A |
| 3,563,566 | 2/1971 | Weber | 267/11 A X |

*Primary Examiner*—Duane A. Reger

[57] ABSTRACT

A suspension damping system for motorcycles and four-wheeled vehicles includes interconnected shock absorbers. As a result of fluid transfer between the shock absorbers, the resultant of compression damping forces is applied relatively close to the vehicle center of gravity, to thereby reduce undesirable side-to-side pitching of a four-wheeled vehicle and fore-and-aft pitching of a motorcycle.

5 Claims, 1 Drawing Figure

DAMPING SYSTEM FOR VEHICULAR SUSPENSION

BACKGROUND OF THE INVENTION

1. Field of the Invention

This invention relates to vehicular suspension systems, and more particularly, to improvements in damping of vehicular suspension systems.

2. Description of the Prior Art

The well-known compromise between good handling and a comfortable ride includes shock absorbers at least as strongly as the other components of automotive and motorcycle suspension systems. Special types of shock absorber valving have done much to reduce this compromise, but it is still a problem, especially in the case of suspension systems designed to negotiate difficult off-road terrain at relatively high speeds.

The main difficulty in off-road driving is that a high rate of jounce damping is required to prevent suspension bottoming, for example, when rapidly crossing abrupt surface irregularities having an amplitude greater than the available suspension travel. In contrast, a reduced damping rate would provide a more comfortable ride over irregularities that are of a substantially lesser magnitude. Shock absorber valving which varies as a function of position or pressure has afforded improvements, but the basic compromise is still evident, particularly when the same vehicle is used for both on-road and off-road driving.

SUMMARY OF THE INVENTION

In light of the above, it is therefore an object of the invention to reduce the compromise between ride comfort and vehicle control in automobiles and motorcycles intended for off-road use.

It is also an object of the invention to present a vehicular suspension damping system allowing mild rotational damping to be combined with stiff linear damping.

In accordance with the invention in its broad aspect, a suspension damping system for off-road vehicles is presented. In addition to a pair of jounce damping cylinders, the invention includes a hydraulic connection for transferring damping fluid from the cylinder experiencing the higher jounce-induced pressure to the other cylinder. Consequently, the rotational damping with respect to the center of mass of the associated vehicle is reduced.

BRIEF DESCRIPTION OF THE DRAWING

The invention is illustrated in the accompanying drawing, in which.

DESCRIPTION OF THE PREFERRED EMBODIMENT

Figure 1:
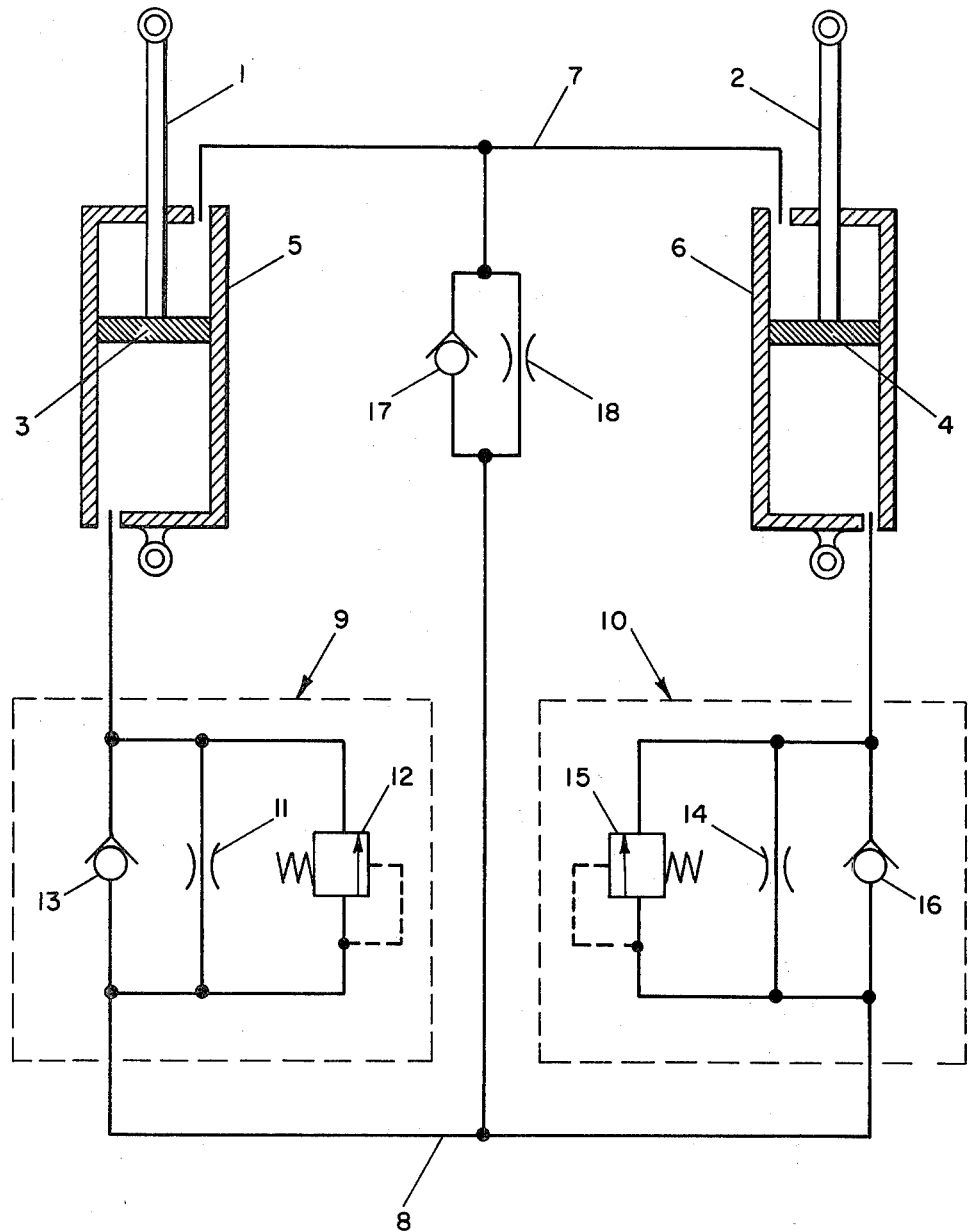
FIG. 1 is a hydraulic circuit for a vehicular suspension damping system constructed in accordance with a preferred embodiment of the invention.

FIG. 1 shows how a damping system would be constructed according to a preferred embodiment of the present invention. This damping system may advantageously be used in both automotive and motorcycle suspension systems. As in the case of a pair of conventional shock absorbers, the upper ends of identical piston rods 1 and 2 are adapted for connection to the suspension-spring-supported structure of the associated vehicle. Pistons 3 and 4 are rigidly attached to their respective piston rods 1 and 2 and fit inside identical double-ended cylinders 5 and 6, each piston forming a good fluid seal. A good fluid seal also exists between each of the piston rods 1 and 2 and the upper ends of their respective cylinders. Still following conventional practice, the lower ends of the cylinders 5 and 6 are adapted for connection to two points of the associated suspension system, each of which approximately follows the motion of the center of a separate wheel of the associated vehicle.

Unlike conventional practice, the pistons 3 and 4 have no internal valving connecting the upper and lower ends of their respective cylinders. Much more important, though, are the connections joining the upper, or rebound, chambers of the two cylinders and that joining the lower, or jounce, chambers. Specifically, the hydraulic conduit 7 directly connects the rebound chamber of cylinder 5 to that of cylinder 6, and the hydraulic conduit 8 connects the jounce chambers of cylinders 5 and 6, valving components being interposed in this latter connection between the jounce chambers. These interposed valving components consist of the identical valve groups 9 and 10 associated with the cylinders 5 and 6 respectively. Valve group 9 is a parallel hydraulic connection of three components: (1) a rebound damping orifice 11, (2) a one-way pressure relief valve 12 oriented to allow a high fluid flow rate into the lower, or jounce, fluid chamber of cylinder 5 when the hydraulic pressure in conduit 8 exceeds that in the cylinder 5 jounce chamber by more than an amount pre-set into the relief valve, and (3) a check valve 13 oriented to allow fluid flow from the jounce chamber of cylinder 5 to the conduit 8 with relatively little pressure drop. Components 14, 15 and 16 making up valve group 10 are identical, respectively, to components 11, 12 and 13 and are correspondingly arranged with respect to fluid flow between conduit 8 and the jounce chamber of cylinder 6.

The jounce damping orifice 18 directly connects the conduit 7 to conduit 8 at a point between the valve groups 9 and 10, and a check valve 17 in parallel with the jounce orifice 18 is oriented to allow rebound fluid flow from either or both of the cylinders 5 and 6 to by-pass the orifice 18.

For automotive use, where at least some difficult off-road driving is anticipated, the cylinders 5 and 6 are preferably connected to damp the suspension motion of laterally opposite wheels, and a damping system as characterized in FIG. 1 is preferably used at each side-to-side pair of wheels. For application to motorcycles, front-to-rear wheel placement of the damping cylinders 5 and 6 is absolutely required.

Finally, the resting positions of the pistons 3 and 4 are important. As shown in FIG. 1, the available jounce travel of either piston relative to its respective cylinder significantly exceeds the available rebound travel of the opposite piston relative to its cylinder. Furthermore, this situation is desirable for all normally loaded conditions of the associated vehicle while at rest, and it may depend on the limits of travel of components other than, or in addition to, the pistons 3 and 4 within the cylinders 5 and 6.

In operation, the two individual wheel damping units which include the individual cylinders 5 and 6 work independently of each other with respect to rebound damping, but jointly with respect to compression, or jounce damping. Beginning with rebound damping, the check valve 17 by-passes rebound fluid flow around the jounce damping orifice 18 so that, for instance, only the valve group 10 affects the rebound damping performance of the cylinder 6. In the valve group 10, the rebound orifice 14 provides a basically high rebound damping rate for the cylinder 6. The pressure relief valve 15, however, is calibrated to pass the great majority of rebound fluid flow when the rebound velocity of the piston 4 relative to the cylinder 6 becomes comparatively high, as when a previously level road surface suddenly drops away from the associated wheel of the vehicle. In contrast, the wheel-to-vehicle velocities generated by the suspension spring force being applied to accelerate the sprung, rather than unsprung, vehicle weight are relatively low. At these lower velocities which characterize undesirable wallowing of the associated vehicle on its suspension system, the relief valve 15 remains nearly seated and a significant portion of the total rebound damping flow passes through the orifice 14. In any case, the advantages of, and the calibration techniques for this type of pressure-limited rebound damping are well known, and the rebound damping of the other cylinder 5 and its cooperating valve group 9 is identical.

When the cylinders 5 and 6 are simultaneously experiencing jounce movement, or compression of the piston rod into the cylinder, the check valves 13 and 16 pass the two resulting fluid flows unrestricted through the rebound valve groups 9 and 10 to meet at the common jounce orifice 18. As a result of the single pressure existing across the orifice 18, the jounce damping forces at the two individual damping units are equal even though the piston-to-cylinder jounce velocities may not be.

In comparison, a pair of conventional shock absorbers would usually, under these same circumstances, apply unequal damping forces to the sprung weight of the associated vehicle, with the result that angular acceleration, or roll, of the vehicle body would be initiated. Since the center of mass of the associated vehicle lies in a vertical plane almost equally spaced between the mounting eyes of the piston rods 1 and 2, the equal jounce damping forces of the present invention will not initiate significant roll of the vehicle body; this is what is meant by reduced rotational damping relative to the linear damping. (The suspension system spring forces can, of course, still be unequal, but the jounce damping forces generated in a heavy-duty off-road vehicle far outweigh the spring forces.)

Since suspension damping systems intended for heavy-duty off-road use must have very stiff linear jounce damping to prevent suspension bottoming, the correspondingly stiff rotational damping obtained with conventional shock absorbers is far in excess of that needed for vehicle stability. In fact, a pure damping system has no effect on the steady-state lean attitude of a cornering vehicle, and excessive rotational damping only increases side-to-side pitching of a vehicle which is rapidly negotiating difficult off-road terrain. The pitching in turn decreases tire traction, and thus vehicle control and speed as well as ride comfort. These same comments generally apply to motorcycle suspension systems as well, except that the pitching and roll in question are fore-and-aft rather than side-to-side.

The example just considered was of the case where both of the piston rods 1 and 2 are simultaneously being compressed into their respective cylinders. Or, in other words, both of the check valves 13 and 16 are open so that the pressures in the jounce chambers of cylinders 5 and 6 are equal in spite of unequal velocities of the pistons 3 and 4 relative to their respective enclosing cylinders. If only one of the piston rods, say rod 2, is being forced further into its cylinder 6, then damping fluid will flow from the jounce chamber of cylinder 6 freely through check valve 16 and into conduit 8. From conduit 8, the fluid flow branches into two streams which rejoin at conduit 7 before flowing back into the rebound chamber of cylinder 6. One of these two streams is simply flow through the jounce orifice 18, and the other stream will unseat relief valve 12 if the velocity of piston 4 into cylinder 6 is at least moderately high. If this piston-to-cylinder velocity is in fact high, the relief valve 12 will conduct a much higher fluid flow rate than will orifice 18, which of course is small to provide the intended high linear damping rate. The fluid conducted by relief valve 12 and by the parallel orifice 11 enters the jounce chamber of cylinder 5 to move the piston 3 upward relative to its cylinder 5. Again, this action may be seen to reduce the roll of the associated vehicle, because both sides of the vehicle will rise together. Piston rod 2 raises its side of the vehicle because its cylinder 6 has been displaced sharply upward by sudden jounce motion of the associated wheel, and piston rod 1 raises the opposite side of the vehicle because the piston 3 is displaced upward within its cylinder 5 as just explained. In contrast, the action of a pair of conventional shock absorbers is to raise the jounced side of the vehicle, but to let the opposite side develop a downward velocity. In the above example, the two upward damping forces exerted on the associated vehicle by the present invention are slightly unequal because of the pressure drop through relief valve 12. This force difference is equal to the area of the underside of the piston 3 or 4 multiplied by the relief pressure setting of valve 12 or 15.

When only the piston rod 2 is suddenly forced deep into its enclosing cylinder 6, the flow through relief valve 12 and into the jounce chamber of cylinder 5 may be seen to relieve the high damping pressure that would otherwise be developed across orifice 18. This apparently soft single-wheel damping is, however, not nearly as disadvantageous as it might at first seem. As mentioned earlier, the increase in the volume of the lower chamber of cylinder 5 that can occur before the piston 3 contacts the upper end of cylinder 5 is significantly less than the volume that can be displaced from the lower chamber of cylinder 6 before the piston 4 contacts the bottom of cylinder 6. Thus, for the suspension ride height characterized in FIG. 1, sudden compression of the piston rod 2 into its cylinder 6 displaces fluid to cause the piston 3 to rise to the top of the cylinder 5. At this point then, no more fluid can be displaced through relief valve 12 and the stiff damping rate of orifice 18 will control the remaining compression of piston 4 into cylinder 6 to thereby effect a sort of two-stage damping. Furthermore, since the relief valves 12 and 15 commonly open in unison, the damping units of the present invention tend to pump up the ride height of the associated vehicle, the increase in ride height being proportional to the roughness of the terrain and the vehicle speed. Consequently, the two-stage damping effect is variable and inherently adjusts to meet changing situations, but it does not absolutely depend on the resting ride height of the associated vehicle being as characterized in FIG. 1. Of course, the associated suspension will normally limit jounce motion to prevent the piston 4 from contacting the bottom of its cylinder 6, and this must be taken into account.

The two-stage damping of the present invention is especially beneficial to a motorcycle landing hard on one wheel after a long jump. While the motorcycle is in flight, the springs of the associated suspension system will fully, or nearly fully, extend the piston rods 1 and 2 from their cylinders, so that the stiff damping rate of the orifice 18 will control all, or nearly all, of the long jounce motion that becomes available for the landing. Suspension bottoming is thereby minimized in spite of the relatively soft rotational damping that exists under less extreme conditions.

The foregoing description of the preferred embodiment has necessarily included specific detail. As such, this description discloses the invention by way of example only, and many changes may be resorted to without departing from the spirit and scope of the invention as herein claimed. As just one example, the center of mass of a motorcycle is rarely located exactly halfway between the upper mounting eyes of the front and rear shock absorbers. Even so, the resultant of the jounce damping forces of the two damping units represented in FIG. 1 can be correspondingly offset by adjusting the relative diameters of the cylinders 5 and 6.

What is claimed is:

1. A suspension damping system for a vehicle, comprising:

a first variable-volume fluid chamber adapted for a mechanical connection to the vehicle, said connection causing a decrease in the volume of said first fluid chamber to accompany jounce motion of a first wheel of the vehicle, but said connection causing comparatively little change in the volume of said first fluid chamber when jounce or rebound motion occurs at any other wheel of the vehicle independently of said first wheel, a second variable-volume fluid chamber adapted for a second mechanical connection to the vehicle, said second connection causing a decrease in the volume of said second fluid chamber to accompany jounce motion of a second wheel of the vehicle, but said second connection causing comparatively little change in the volume of said second fluid chamber when jounce or rebound motion occurs at any other wheel of the vehicle independently of said second wheel, said second wheel being suspended relatively independently of said first wheel, a connection allowing fluid transfer between said first and said second fluid chambers, whereby rotational damping of the vehicle is reduced, fluid flow restricting means for resisting a decrease in the total fluid volume of said first and said second fluid chambers, and for relieving the static fluid pressure in each of said two fluid chambers to a value no more than a small fraction of that which would arise from supporting, through said two mechanical connections, the sprung weight of the vehicle while at rest, means for containing fluid displaced from either of said two fluid chambers through said fluid flow restricting means, and means for returning fluid from said containing means to said fluid chambers.

2. The suspension damping system of claim 1 wherein said fluid flow restricting means comprises an orifice connected to deliver fluid to said fluid containing means from said connection between said two fluid chambers.

3. The suspension damping system of claim 1 wherein said fluid containing means comprises:

a third variable-volume fluid chamber wherein any change in volume is the negative of the change in volume of said first fluid chamber multiplied by a constant factor, a fourth variable-volume fluid chamber wherein any change in volume is the negative of the change in the volume of said second fluid chamber multiplied by a constant factor, and means for allowing fluid flow between said third and said fourth fluid chambers.

4. The suspension damping system of claim 3 wherein said first and said third fluid chambers are the two compartments within a first double-ended piston-and-cylinder assembly, and wherein said second and said fourth fluid chambers are the two compartments within a second double-ended piston-and-cylinder assembly.

5. The suspension damping system of claim 3 further comprising means for conducting rebound-induced fluid flow from said third to said first fluid chamber and means for conducting rebound-induced fluid flow from said fourth to said second fluid chamber.

* * * * *